United States Patent [19]

Ohno et al.

[11] 4,378,122

[45] Mar. 29, 1983

[54] HOLLOW STABILIZER FOR VEHICLE

[75] Inventors: Akira Ohno; Toshiaki Sato; Kanji Inoue, all of Yokohama, Japan

[73] Assignee: NHK Spring Co., Ltd., Yokohama, Japan

[21] Appl. No.: 183,634

[22] Filed: Sep. 3, 1980

[30] Foreign Application Priority Data

Sep. 7, 1979 [JP] Japan .............................. 54-123804[U]

[51] Int. Cl.³ .............................................. B60G 21/02
[52] U.S. Cl. ...................................... 280/689; 72/367; 72/377; 280/721
[58] Field of Search .................. 280/689, 721; 72/367, 72/369, 370, 377

[56] References Cited

U.S. PATENT DOCUMENTS

| | | | |
|---|---|---|---|
| 1,823,158 | 9/1931 | Mogford et al. | 29/517 |
| 2,494,128 | 1/1950 | Holmquist et al. | 72/367 |
| 2,589,009 | 3/1952 | Leighton | 267/11 R |
| 2,780,000 | 2/1957 | Huet | 72/377 |
| 4,033,605 | 7/1977 | Smith et al. | 280/664 |
| 4,138,141 | 2/1979 | Andersen | 280/689 |

FOREIGN PATENT DOCUMENTS

| | | |
|---|---|---|
| 281450 | 5/1966 | Australia . |
| 2805007 | 8/1979 | Fed. Rep. of Germany . |
| 2846445 | 4/1980 | Fed. Rep. of Germany . |
| 2099149 | 10/1972 | France . |
| 1012037 | 12/1965 | United Kingdom . |

*Primary Examiner*—Robert R. Song
*Attorney, Agent, or Firm*—Frishauf, Holtz, Goodman & Woodward

[57] ABSTRACT

The hollow stabilizer is made from a single pipe and has a torsion section coupled to a vehicle, curved sections each integrally extending from each end of the torsion section, and arm sections each integrally extending from each of the curved sections. All these sections have the same outer diameter, and the curved sections have an increased thickness compared to the rest of the stabilizer.

2 Claims, 3 Drawing Figures

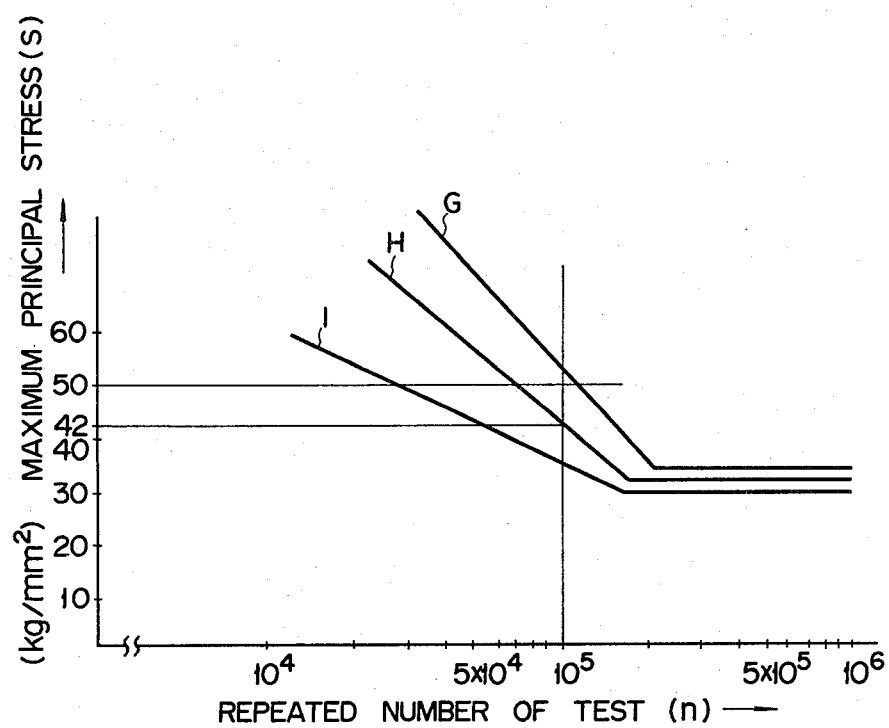

HOLLOW STABILIZER FOR VEHICLE

BACKGROUND OF THE INVENTION

This invention relates to a hollow stabilizer for a vehicle, which is made from a single pipe and has a torsion section coupled to a vehicle frame, curved sections each integrally extending from each end of the torsion section and arm sections each integrally extending from each curved section and having a free end coupled to a wheel suspension.

Stabilizers of this sort have hitherto been used for the purpose of improving the feel of riding and the stability of vehicles such as automobiles by improving the tilting of the vehicle caused at the time of the turning due to centrifugal forces at this time and unbalance of the ground pressure on the opposite side wheels that is caused at such time. Usually, the stabilizer has a construction constituted by a single metal pipe, which has a central torsion section terminating at the opposite ends in curved sections defining an obtuse angle and terminating in turn in respective arm sections. The torsion section is coupled to the frame of the automobile or the like via mounting members such that it extends in the lateral direction, while the arm sections are coupled to the opposite sides of a vehicle suspension via coupling sections provided at their free ends. Mounted in this way, the stabilizer acts to suppress the outward tilting of the vehicle and also the floating of the inner wheels at the time of the turning of the vehicle with the twisting of the torsion section, the bending of the arm sections and the twisting and bending of the curved sections. Thus, various characteristics of the stabilizer have to be suitably set by taking the weight of the vehicle, the height of the centroid thereof, the construction of the wheel suspension, etc. into consideration.

In order to reduce the weight of the stabilizer it has been in practice to manufacture the stabilizer from a metal pipe. In this case, however, if the pipe thickness is excessively reduced for increasing the weight reduction factor, the fatigue strength is reduced. Accordingly, it has been proposed to appropriately set the outer diameter and thickness of the pipe to meet the maximum load stress. However, such a hollow stabilizer has a uniform outer diameter and a uniform thickness over its entire length, and some portions of it do not require the preset thickness; that is, they have an extra thickness, so that there is still some room for improvement regarding weight reduction.

The invention developed from research and investigations concerning the distribution of the load applied to the stabilizer, and its primary object is to provide a hollow stabilizer for a vehicle, which is light in weight and in which the material is adequately distributed to prevent reduction of the fatigue strength.

SUMMARY OF THE INVENTION

To achieve the above objective, in the hollow pipe-type stabilizer according to the invention, which comprises a torsion section, curved sections and arm sections, the wall thickness of only the hollow curved sections is increased compared to the wall thicknesses of the other sections, while all the sections have the same outer diameter.

With this stabilizer construction according to the invention, with the thickness increased for only the curved sections in which the maximum principal stress is produced, weight reduction can be achieved without reducing the fatigue strength.

BRIEF DESCRIPTION OF THE DRAWING

FIG. 3 is a graph showing the relation between the maximum principal stress and the number of repetitions of the test.

DETAILED DESCRIPTION

Figure 1:
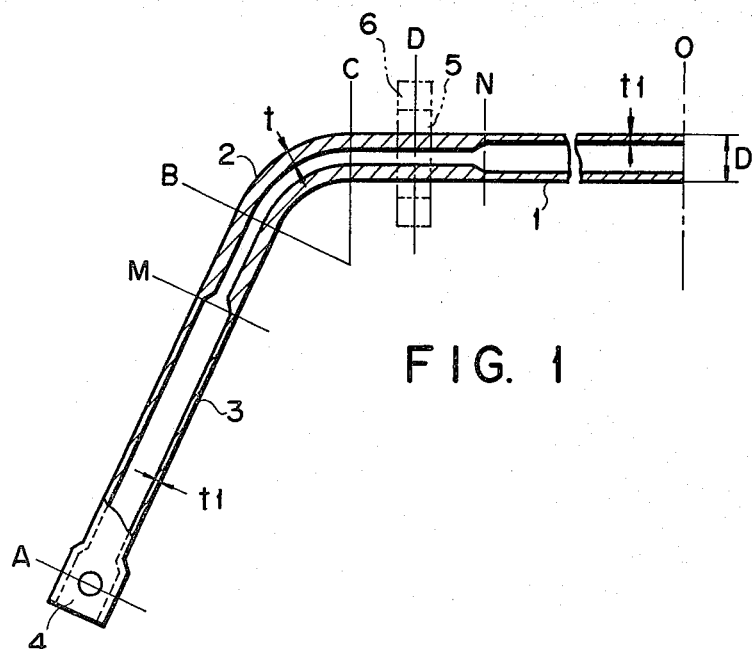
FIG. 1 is a sectional view showing the left hand half of an embodiment of the stabilizer according to the invention.

FIG. 1 shows the left hand half of the stabilizer according to the invention. Since this stabilizer is symmetrical with respect to a line O, its right hand half is not shown.

The illustrated stabilizer has a torsion section 1 terminating at each end in a curved section 2 which defines an obtuse angle and terminates in turn in an arm section 3. The free end of the arm section 3 is provided with a flat coupling section 4 which is coupled to a wheel suspension (not shown). The torsion section 1, curved sections 2 and arm sections 3 are formed from a single pipe. The torsion section 1, curved sections 2 and arm sections 3 have a uniform diameter, and the coupling sections 4 have a flat shape. A predetermined portion of the stabilizer between positions M and N and including the curved section 2 has a thickness t greater than the thickness $t_1$ of the rest of the stabilizer ($t > t_1$); that is, its inner diameter is reduced compared to the rest of the stabilizer. In the instant embodiment the thickness ratio t/D (t being the thickness and D being the outer diameter) of the section M-N is 0.20, so that its weight reduction factor (i.e., sectional area reduction factor) with respect to a solid rod having the same outer diameter is 30%. On the other hand, in the rest of the stabilizer the thickness ratio $t_1/D$ is 0.12, and the weight reduction factor is 50%. The torsion section 1 is coupled at its opposite ends to a vehicle frame (not shown) by rubber bushes 5 and mounting members 6 shown by imaginary lines.

The reasons for, and effects of, the above construction will now be discussed.

Figure 2:
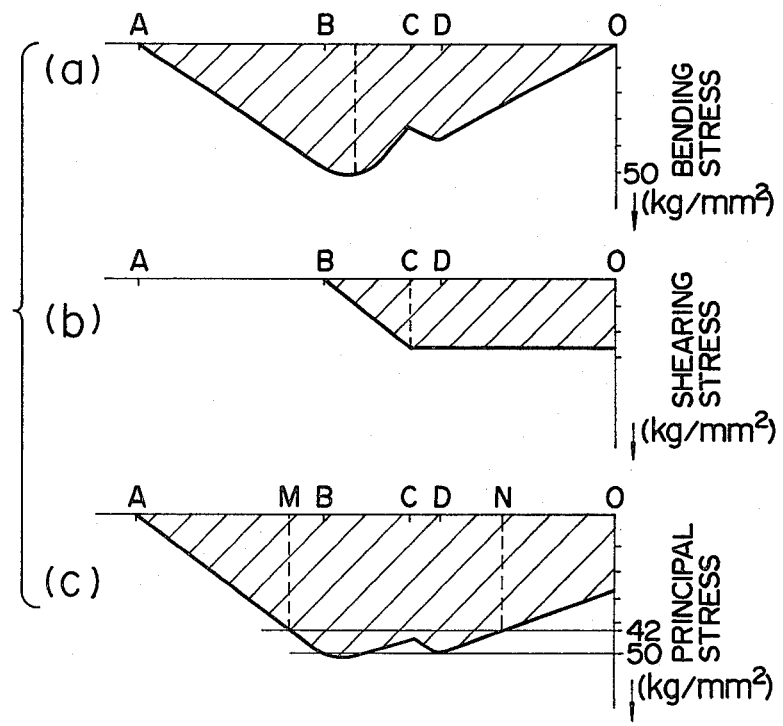
FIGS. 2(a), 2(b) and 2(c) are graphs respectively showing the bending stress distribution characteristic, shearing stress distribution characteristic and principal stress distribution characteristic of the stabilizer of FIG. 1.

FIGS. 2(a) to 2(c) show stress distributions of the stabilizer, with the ordinate taken for the stress and points A, B, C, D, M, N and O on the abscissa corresponding to respective positions of the stabilizer in FIG. 1 including the position of the center line O. FIG. 2(a) shows the bending stress distribution. As is seen from FIG. 2(a) the maximum bending stress is produced in a section B-C including the curved section 2. FIG. 2(b) shows the shearing stress distribution. As is seen, no shearing stress is produced in the section A-B at all, but a uniform stress is produced in the section C-O. FIG. 2(c) shows the principal stress distribution which is the resultant of the stress distributions of FIGS. 2(a) and 2(b). It will be understood that the maximum principal stress is produced in the section B-C including the curved section 2 and that in many cases a point of rupture due to fatigue occurs in this section B-C. This is verified in practice.

FIG. 3 shows the relation between the maximum principal stress (S) and the number (n) of repeated load tests for various pipes. Plot G in FIG. 3 represents the characteristic of a mechanical construction purpose carbon steel pipe STKM 17 which is heat treated (HRC being 40 or above) and having a thickness ratio of $t/D=0.20$ and a weight reduction factor of 30%. Plot H represents the characteristic of the same pipe but having a thickness ratio of $t/D=0.12$ and a weight reduction factor of 50%. Plot I represents the characteristic of the same pipe but having a thickness ratio of $t/D=0.08$ and a weight reduction factor of 60%.

Generally, a stabilizer is required to guarantee that it can withstand the maximum principal stress rupture test $10^5$ times. Among the plots in FIG. 3 only plot G is qualified as the characteristic which corresponds to a service life of over $10^5$ repeated tests with the maximum principal stress of about 50 kg/mm² shown in FIG. 2(c). Plot H represents a characteristic corresponding to a service life of over $10^5$ repeated tests with a maximum principal stress of about 42 kg/mm². The plot for this principal stress level in FIG. 2(c) is found in the shaded portion in the section M-N. Thus, the section M-N including the curved section 2 in FIG. 1 is set to coincide with the section M-N in FIG. 2(c).

More particularly, a thickness ratio of $t/D=0.20$ and a weight reduction factor of 30% are set for the section M-N in FIG. 1 to meet the characteristic of plot G in FIG. 3 while setting a thickness ratio of $t_1/D=0.12$ and a weight reduction ratio of 50% for the rest of the stabilizer. The construction so designed can withstand over $10^5$ repeated rupture tests.

It is found from calculations that the length of the section M-N corresponds to about one-fourth of the length of the section A-O. Consequently, the weight reduction factor of the entire length of the stabilizer having the construction as shown in FIG. 1 is $\frac{1}{4}\times 30\% + \frac{3}{4}\times 50\%$. In other words, a weight reduction factor of 45% can be achieved for the whole stabilizer length, and this value is a 15% increase from the conventionally obtained weight reduction factor of 30%. Besides, this achievement can be obtained without any sacrifice in the fatigue life.

Since the stress distribution in the stabilizer varies with the kind and type of the vehicle and the shape of the stabilizer and particularly since the dimensions of the section M-N varies with the material used, the increased thickness section should cover at least the curved section 2, i.e., the section B-C.

As has been described in the foregoing, in the stabilizer according to the invention the torsion section, curved sections and arm sections all have a uniform outer diameter, and the thickness is increased only for the curved sections, in which the maximum principal stress is produced. Thus, it is not only possible to improve the mechanical strength of the curved sections and prevent the reduction of the fatigue strength, the weight reduction factor of the whole stabilizer can be increased because the thickness of the other sections than the curved sections is small. Besides, since the stabilizer itself is thus reduced in weight, it is possible to reduce the weight of the vehicle in which this stabilizer is mounted. Further, the increase of the weight reduction factor means the reduction of the material used; that is, according to the invention it is possible to reduce material cost.

What we claim is:

1. A hollow stabilizer for a vehicle made from a single hollow pipe comprising:

a torsion section adapted to be coupled to a vehicle frame;

curved sections integrally extending from each end of said torsion section; and arm sections each integrally extending from each of said curved sections and having coupling means adapted to be coupled to a wheel suspension of the vehicle;

said torsion section, said curved sections and said arm sections all having the same outer diameter;

said curved sections having a smaller inner diameter than said torsion section and said arm section, and said curved sections thus having a greater wall thickness than said torsion section and said arm sections.

2. A hollow stabilizer according to claim 1, wherein said torsion section and said arm sections have the same wall thickness.

* * * * *